United States Patent
Kasahara et al.

(10) Patent No.: US 6,777,130 B2
(45) Date of Patent: Aug. 17, 2004

(54) SQUARE BATTERY

(75) Inventors: Hideki Kasahara, Naka-gun (JP);
Masumi Katsumoto, Chigasaki (JP);
Masaharu Miyahisa, Fujisawa (JP);
Yoshihiro Boki, Fujisawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 241 days.

(21) Appl. No.: 10/169,652

(22) PCT Filed: Nov. 19, 2001

(86) PCT No.: PCT/JP01/10105
§ 371 (c)(1),
(2), (4) Date: Jul. 8, 2002

(87) PCT Pub. No.: WO02/43166
PCT Pub. Date: May 30, 2002

(65) Prior Publication Data
US 2003/0017389 A1 Jan. 23, 2003

(30) Foreign Application Priority Data
Nov. 22, 2000 (JP) ........................ 2000-356169

(51) Int. Cl.⁷ ............................................... H01M 2/02
(52) U.S. Cl. ................................... 429/176; 429/164
(58) Field of Search ................................. 429/176, 164

(56) References Cited

U.S. PATENT DOCUMENTS

| | | | |
|---|---|---|---|
| 5,556,722 A | | 9/1996 | Narukawa et al. |
| 5,827,621 A | * | 10/1998 | Morishita et al. ............ 429/176 |
| 6,190,794 B1 | * | 2/2001 | Wyser .......................... 429/94 |
| 2003/0182792 A1 | * | 10/2003 | Katsumoto et al. ......... 29/623.2 |

FOREIGN PATENT DOCUMENTS

| | | |
|---|---|---|
| JP | 62-093854 | 4/1987 |
| JP | 5-013054 | 1/1993 |
| JP | 7-326331 | 12/1995 |
| JP | 8-250095 | 9/1996 |

* cited by examiner

Primary Examiner—Patrick Ryan
Assistant Examiner—Tracy Dove
(74) Attorney, Agent, or Firm—Jordan and Hamburg LLP

(57) ABSTRACT

A battery case (1, 8), substantially square in cross section, has four lateral walls (5, 6) each of which is gradually arc-shaped to expand outwardly with a radius of curvature R1. The cross section is adapted to satisfy equation $R1/r=4$ to 20, where r is the distance between a midpoint (C2) of each lateral wall (5, 6) and the center point (C1) in the cross section of the battery case (1, 8) and R1 is the radius of curvature. In addition, the battery case (8) is rounded at each corner with a radius of curvature of R2, and has a cross section that satisfies equation $R2/r=0.3$ to 0.8, where r is the distance between the midpoint (C2) of each lateral wall (6) and the center point (C1) in the cross section of the battery case (8) and R2 is the radius of curvature of each corner.

5 Claims, 4 Drawing Sheets

SQUARE BATTERY

TECHNICAL FIELD

The present invention relates to a sealed prismatic battery having power generation elements accommodated in a battery case having a substantially prismatic cross section.

BACKGROUND ART

Recently, as a variety of portable electrical devices have been developed, the development of batteries for supplying drive power to the devices has been increasingly valued as a critical one of key devices. Among other things, compact rechargeable batteries such as nickel-metal hydride rechargeable batteries and lithium rechargeable batteries have been developed and increasingly grown in demand to be used recently in applications such as a power supply for driving hybrid electric vehicles in addition to cellular phones, notebook personal computers, or video cameras.

In recent years, electrical devices such as cellular phones have been increasingly demanded to be more compact and thinner, which has been in turn raising requirements for more compact and thinner batteries as their power sources. The present batteries are largely divided into cylindrical and prismatic ones in shape. For the cylindrical battery, a plurality of batteries may be accommodated in a pack case to form a battery pack or a plurality of batteries may be accommodated in the battery storage portion of an electrical device. In either case, poor space efficiency is provided due to the presence of many useless spaces or dead spaces as well as instability is caused inside the storage space. This makes the cylindrical battery unsuitable for the aforementioned electrical device that are to be made thinner and more compact. In contrast to this, the prismatic battery provides high space efficiency and can be accommodated with stability in the storage space, thus being suitable for the electrical device that are to be made thinner and more compact.

However, the sealed prismatic rechargeable battery may be subjected to an increase in pressure inside the battery due to gases produced during charge and discharge, and expansion of the power generation elements accommodated in the battery case. In this case, the battery case is deformed to take a more stable shape, that is, a circular shape, such that long lateral walls of the battery case are subjected to a relatively large deformation to expand outwardly. Such a deformation of the battery case causes various deleterious effects. For example, in a sealed battery where the outermost electrode plate of a spiral-wound electrode group is in electrical contact with the inner surface of the battery case, the contact resistance between the outermost electrode plate and the battery case is increased, resulting in an increased internal resistance of the battery.

In this context, conventionally suggested are the following methods of providing means for preventing the battery case from being deformed due to an increase in pressure inside a prismatic battery. Japanese Patent Laid-Open Publication No. Sho. 62-93854 discloses providing part of a battery case with a portion having an increased thickness, thereby reinforcing the battery case. Japanese Patent Laid-Open Publication No. Hei. 7-326331 discloses a battery case having a rectangular cross section, configured such that the inner surface of each corner is gradually arc-shaped to make the corners thicker than the long and short lateral walls, which are connected to each other at each corner.

By providing part of the battery case with a portion having an increased thickness, the battery case can be prevented from being deformed due to an increase in pressure inside the battery. However, the battery case is increased in outer shape and thus cannot be made compact. On the other hand, by increasing the thickness at the corners of the rectangular battery case, the battery case can be prevented from being deformed due to an increase in pressure inside the battery while preventing the battery case from increasing in outer shape. However, the battery case is reduced in volume and thus filled with a reduced amount of active substances for positive and negative electrodes of the electrode group, thereby reducing the energy density per volume.

The present invention has been developed in light of the aforementioned problems. An object of the present invention is to provide a prismatic battery which has a battery case that causes neither an increase in outer shape nor a decrease in inner volume but has a high pressure resistance enough to prevent the battery case from being deformed due to an increase in pressure inside the battery.

DISCLOSURE OF THE INVENTION

To achieve the above object, the present invention provides a prismatic battery having a prismatic tubular battery case for housing an electrode group and electrolyte solution, with an opening of the battery case being sealed with a sealing member. The prismatic battery is characterized in that the battery case, substantially square in cross section, has four lateral walls each being gradually arc-shaped to curve outwardly with a radius of curvature $R1$, and in that the cross section satisfies equation $R1/r=4$ to 20, where $r$ is the distance between a midpoint of each lateral wall and the center point in the cross section of the battery case and $R1$ is the radius of curvature.

The prismatic battery is configured to have the battery case substantially square in cross section with each lateral wall of the battery case being slightly expanded outwardly to satisfy that $R1/r>4$, and thus has high space efficiency generally equal to that of existing prismatic batteries. In addition, the prismatic battery is configured such that the lateral walls of the battery case are gradually arc-shaped to expand outwardly to satisfy that $R1/r<20$. When an increase in pressure inside the battery occurs due to gases produced during charge and discharge and expansion of the electrode group, this configuration positively prevents each lateral wall from being deformed to further expand outwardly. Moreover, since this prismatic battery increases its inner volume by such an amount as provided by the lateral walls that are slightly expanded outwardly, it is possible to accommodate more power generation elements such as electrolyte solution in the increased space, thereby improving the energy density. In addition, with the battery case being entirely formed in a uniform thickness, the battery case is free from any decrease in inner volume. Even in generally the same outer shape as that of an existing prismatic battery, the prismatic battery provides a large amount of current at the time of charge and discharge. This allows the prismatic battery to provide the battery characteristics of a large capacity and a high energy density.

The invention also provides a prismatic battery having a prismatic tubular battery case for housing an electrode group and electrolyte solution, with an opening of the battery case being sealed with a sealing member. The prismatic battery is characterized in that the battery case, substantially rectangular in cross section and with a pair of long lateral walls facing each other and a pair of short lateral walls facing each other, has the cross section such that the long lateral walls are each gradually arc-shaped to curve outwardly with a radius of curvature R11 to satisfy equation R11/r1=4 to 20, where r1 is the distance between a midpoint of the inner surface of the long lateral wall and the center point in the cross section of the battery case and R11 is the radius of curvature. The prismatic battery is also characterized in that the short lateral walls are each gradually arc-shaped to curve outwardly with a radius of curvature R12 to satisfy equation R12/r2=4 to 20, where r2 is the distance between a midpoint of the short lateral wall and the center point in the cross section of the battery case and R12 is the radius of curvature.

The prismatic battery is configured to have the battery case substantially rectangular in cross section with the long lateral walls of the battery case being slightly expanded outwardly to satisfy that R11/r1>4 and with the short lateral walls being slightly expanded outwardly to satisfy that R12/r2>4, and thus has high space efficiency generally equal to that of existing prismatic batteries. In addition, the prismatic battery is configured such that the long lateral walls of the battery case are gradually arc-shaped to expand outwardly to satisfy that R11/r1<20 and the short lateral walls are gradually arc-shaped to expand outwardly to satisfy that R12/r2<20. When an increase in pressure inside the battery occurs due to gases produced during charge and discharge and expansion of the electrode group, this configuration positively prevents each lateral wall from being deformed to further expand outwardly. Moreover, since this prismatic battery increases its inner volume by such an amount as provided by the lateral walls that are slightly expanded outwardly, it is possible to accommodate more power generation elements such as electrolyte solution in the increased space, thereby improving the energy density. In addition, with the battery case being entirely formed in a uniform thickness, the battery case is free from any decrease in inner volume. Even in generally the same outer shape as that of an existing prismatic battery, the prismatic battery provides a large amount of current at the time of charge and discharge. This allows the prismatic battery to provide the battery characteristics of a large capacity and a high energy density.

BEST MODE FOR CARRYING OUT THE INVENTION

Figure 1:
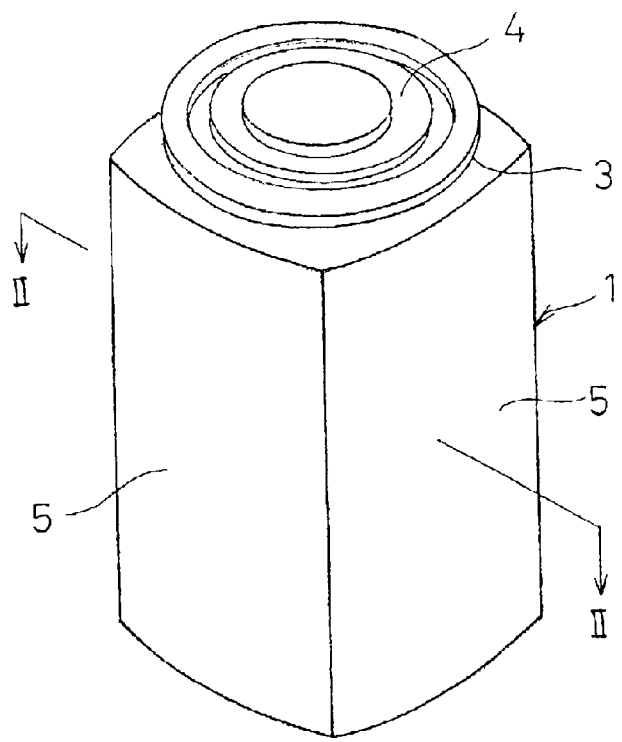
FIG. 1 is a perspective view illustrating a prismatic battery according to a first embodiment of the present invention.
Figure 2:
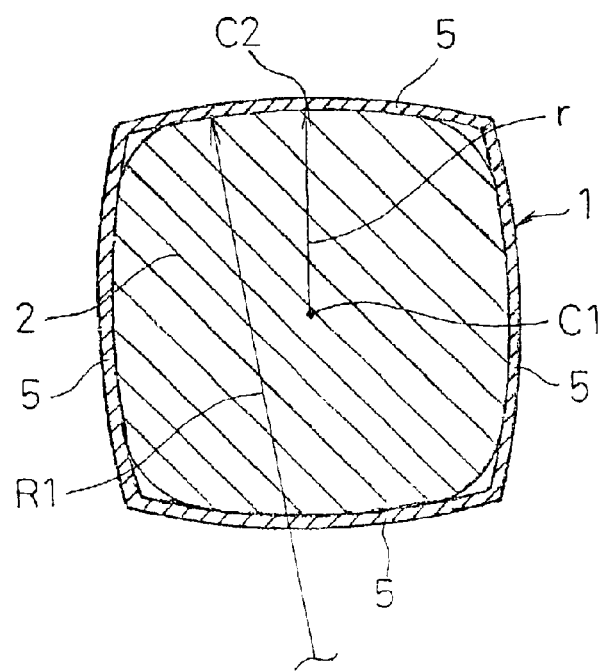
FIG. 2 is a cross sectional view taken along the line II—II of FIG. 1.

Now, preferred embodiments of the present invention will be described with reference to the accompanying drawings. FIG. 1 is a perspective view illustrating a prismatic battery according to a first embodiment of the present invention. FIG. 2 is a cross-sectional view taken along the line II—II of FIG. 1. The prismatic battery is configured to have a bottomed battery case 1 that is formed in the shape of a prismatic tube to be substantially square in cross section. Inside the battery case 1, a spiral-wound electrode group 2 is accommodated which is made up of a strip of known positive electrode and negative electrode plates with a separator interposed therebetween. An electrolyte solution (not shown) is then poured in the battery case 1, followed by fitting a sealing member 4 into a cylindrical open end portion 3 of the battery case 1 and then inwardly caulking the open peripheral edge of the open end portion 3 to seal the portion 3 with the sealing member 4.

As shown in FIG. 2, the battery case 1, substantially square in cross section, is configured to have four lateral walls 5 each of which is gradually arc-shaped to curve outwardly with a predetermined radius of curvature R1. The cross section is adapted to satisfy equation R1/r=4 to 20, where R1 is the aforementioned radius of curvature and r is the distance between a midpoint C2 of the inner surface of each lateral wall 5 and the center point C1 in the cross section of the battery case 1.

The electrode group 2 is configured to have a strip of the positive electrode plate, a strip of the negative electrode plate, and a strip of the separator, each being spirally wound in the shape of a cylinder. Then, the electrode group 2 is preferably compressed using a die to be rectangular in cross section corresponding to the cross section of the battery case 1 so as to be press fit into the battery case 1. This configuration allows the electrode group 2, when inserted into the battery case 1, to slightly relax its tension and thus slightly deform to curve outwardly due to its restoring force to its original circular shape, thereby allowing the electrode group 2 to come into contact with each of the lateral walls 5.

The prismatic battery includes the battery case 1 substantially square in cross section with each lateral wall 5 being slightly expanded outwardly, and thus has high space efficiency generally equal to that of existing prismatic batteries. However, setting such that R1/r<4 would reduce the space efficiency to the same order as that of existing cylindrical batteries.

In addition, the prismatic battery is configured such that the four lateral walls 5 of the battery case 1 are each gradually arc-shaped to expand outwardly. When an increase in pressure inside the battery occurs due to gases produced during charge and discharge and expansion of the electrode group 2, this configuration positively prevents each lateral wall 5 of the battery case 1 from being deformed to further expand outwardly, unlike the existing prismatic battery with four lateral walls each having a straight flat surface. In this case, setting such that R1/r>20 would make it impossible to sufficiently prevent the lateral wall 5 from expanding outwardly.

The prismatic battery significantly reduces the deformation of the battery case 1 caused by the pressure inside the battery, thereby maintaining the contact resistance at a predetermined value between the outermost electrode plate of the electrode group 2 and the inner peripheral surface of the battery case 1. This eliminates deleterious effect of increasing the internal resistance of the battery. Furthermore, when compared with the existing prismatic battery rectangular in cross section, the prismatic battery increases its volume by such an amount as provided by the four lateral walls 5 that are slightly expanded outwardly. This makes it possible to accommodate more power generation elements such as electrolyte solution in the increased space, thereby improving the energy density. Furthermore, with the lateral walls 5 being entirely formed in a uniform thickness, the battery case 1 prevents the lateral walls 5 from expanding without a portion increased in thickness being provided thereon as in the aforementioned conventional prismatic battery, thereby causing no decrease in inner volume. This allows the prismatic battery to provide a large amount of current at the time of charge and discharge, thereby providing the battery characteristics of a large capacity and a high energy density.

Figure 3:
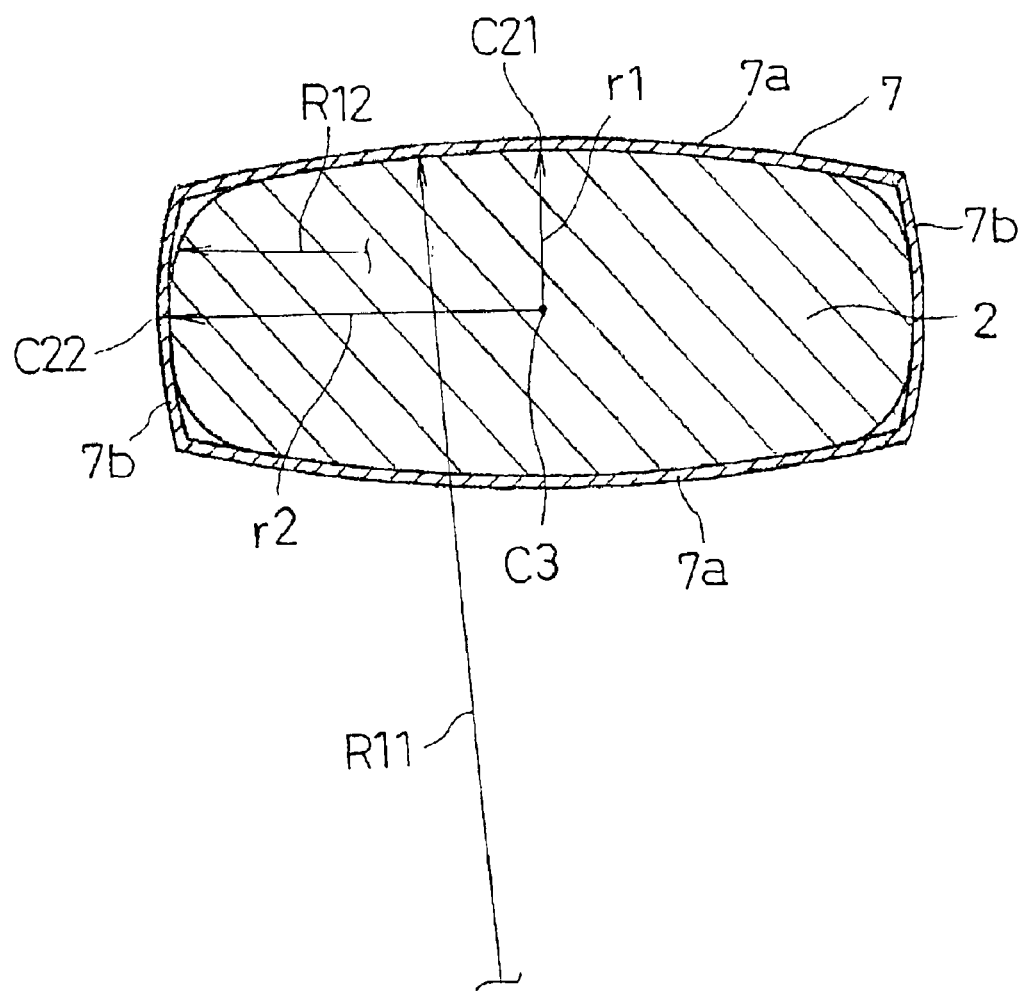
FIG. 3 is a cross sectional view illustrating a prismatic battery according to a second embodiment of the invention.

FIG. 3 is a cross-sectional view illustrating a prismatic battery according to a second embodiment of the invention, where the same reference symbols designate the same or like elements as those of FIG. 2. A battery case 7 of the prismatic battery is substantially rectangular in cross section and has a pair of long lateral walls 7a facing each other and a pair of short lateral walls 7b also facing each other.

That is, the battery case 7 is configured such that the long lateral walls 7a are each gradually arc-shaped to curve outwardly with a predetermined radius of curvature R11, in order to satisfy equation $R11/r1=4$ to 20, where r1 is the distance between a midpoint C21 of the inner surface of a long lateral wall 7a and the center point C3 in the cross section of the battery case 7 and R11 is the radius of curvature. The battery case 7 is also configured such that the short lateral walls 7b are each gradually arc-shaped to curve outwardly with a predetermined radius of curvature R12, in order to satisfy equation $R12/r2=4$ to 20, where r2 is the distance between a midpoint C22 of the inner surface of a short lateral wall 7b and the center point C3 in the cross section of the battery case 7 and R12 is the radius of curvature.

Like the prismatic battery of the first embodiment, this prismatic battery having the battery case 7 rectangular in cross section positively prevents the battery case 7 from being deformed to further expand outwardly when an increase in pressure inside the battery occurs due to gases produced during charge and discharge and expansion of the electrode group 2. In addition, this prismatic battery accommodates more power generation elements such as electrolyte solution than the existing prismatic battery, thereby making it possible to provide a large amount of current at the time of charge and discharge and provide the battery characteristics of a large capacity and a high energy density.

Figure 4:
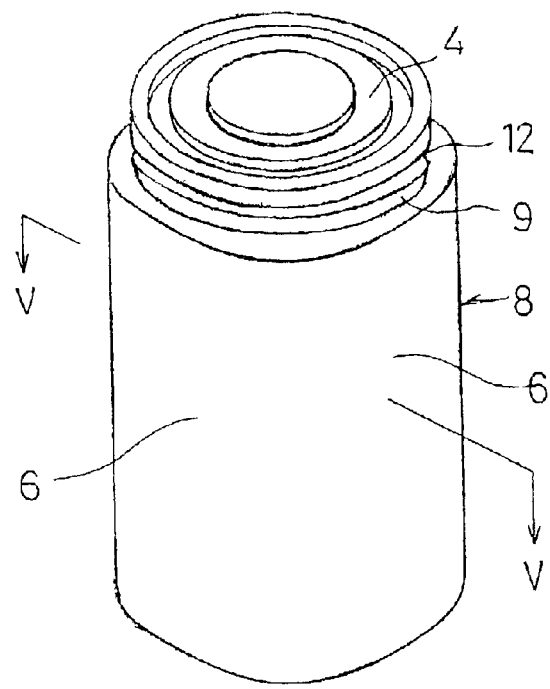
FIG. 4 is a perspective view illustrating a prismatic battery according to a third embodiment of the invention.
Figure 5:
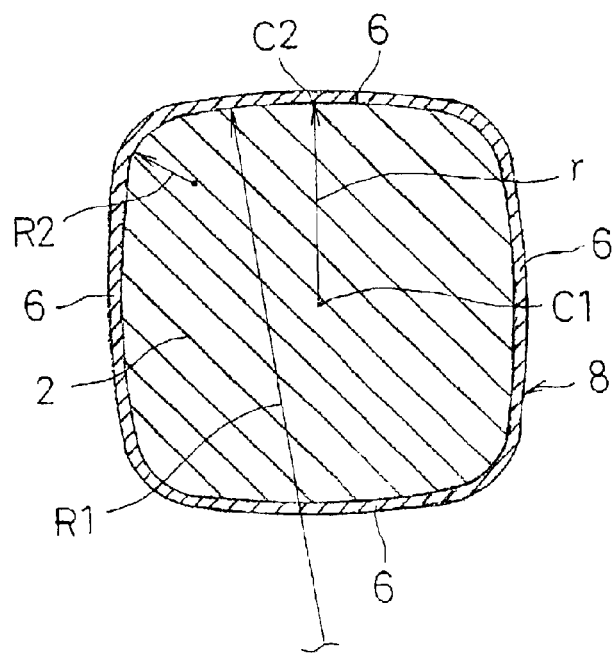
FIG. 5 is a cross sectional view taken along the line V—V of FIG. 4.

FIG. 4 is a perspective view illustrating a prismatic battery according to a third embodiment of the invention, and FIG. 5 is a cross sectional view taken along the line V—V of FIG. 4, where the same reference symbols designate the same or like elements as those of FIGS. 1 and 2. This prismatic battery is configured to have a battery case 8 that is substantially square in cross section like the one according to the first embodiment. Inside the battery case 8, the spiral-wound electrode group 2 is accommodated which is made up of a strip of known positive electrode and negative electrode plates with a separator interposed therebetween. An electrolyte solution is then poured in the battery case 8, followed by fitting the sealing member 4 into a cylindrical open end portion 9 of the battery case 8 and then inwardly caulking the open peripheral edge of the open end portion 9 to seal the portion 9 with the sealing member 4.

As shown in FIG. 5, the battery case 8, substantially square in cross section, is configured to have four lateral walls 6 each of which is gradually arc-shaped to curve outwardly with a predetermined radius of curvature R1. The cross section is adapted to satisfy equation $R1/r=4$ to 20, where r is the distance between a midpoint C2 of the inner surface of each lateral wall 6 and the center point C1 in the cross section of the battery case 8 and R1 is the radius of curvature. This shape itself is the same as that of the battery case 1 according to the first embodiment. In addition to this shape, the four corners, each of which is a boundary between two neighboring lateral walls 6, are each arc-shaped with a predetermined radius of curvature R2. The arc shape is adapted to have a cross section that satisfies equation $R2/r=0.3$ to 0.8, where r is the distance between the midpoint C2 of the inner surface of each of the lateral walls 6 and the center point C1 in the cross section of the battery case 8 and R2 is the radius of curvature.

Thus, this prismatic battery provides the same effect as that of the first embodiment. In addition, suppose that a plurality of batteries are accommodated side by side in a pack case to form a battery pack or accommodated in the battery storage portion of an electrical device. In this case, since the prismatic battery is adapted to satisfy that $R2/r>0.3$, the batteries prevent damage or scratches which may occur when brought into contact with another, and are never reduced in the effect of preventing an expansion of the lateral walls 6 due to an increase in pressure inside the battery. Furthermore, since it is set that $R2/r<0.8$, the space efficiency is never reduced.

Figure 6A:
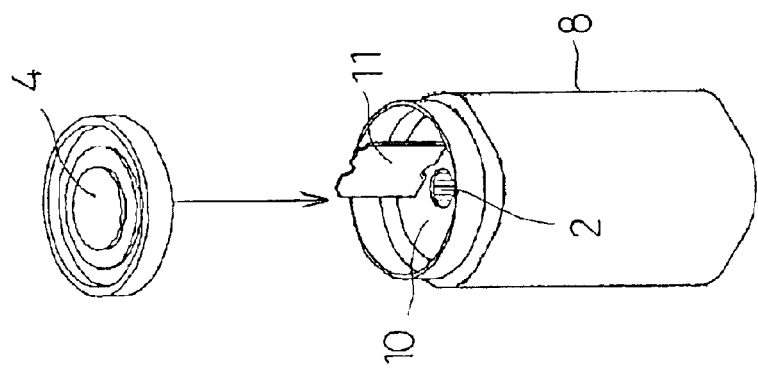
FIGS. 6A to 6C are perspective views illustrating the fabrication process of the prismatic battery in sequence.
Figure 6B:
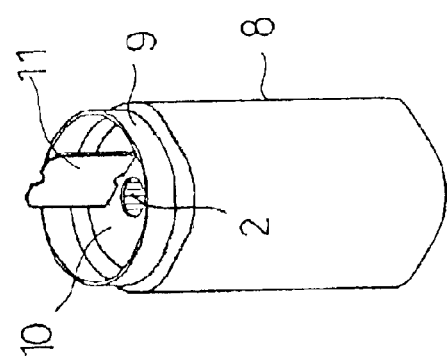
Figure 6C:
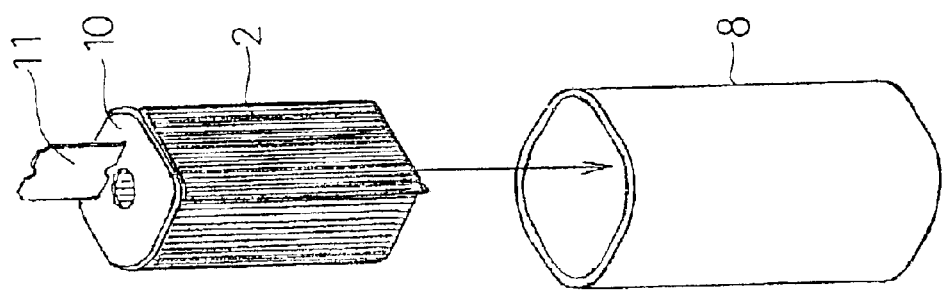

FIGS. 6A to 6C are perspective views of the fabrication process of the prismatic battery in sequence, and by way of example, illustrate the fabrication process of the prismatic battery according to the third embodiment. The prismatic battery according to each of the first and second embodiments can also be fabricated in the same process. First, as shown in FIG. 6A, the battery case 8 is formed in the shape of a bottomed cylinder to be substantially square in cross section as shown in FIG. 5. The electrode group 2 is configured such that the positive electrode plate and the negative electrode plate, both having the shape of a strip, are superimposed on the other and spirally wound with a separator interposed therebetween, and then compressed to be substantially square in cross section corresponding to the cross section of the battery case 8. The electrode group 2 includes a positive electrode lead plate 11 that is protruded upwardly and a negative electrode lead plate (not shown) that is protruded downwardly. The electrode group 2 thus configured is inserted into the battery case 8.

After the electrode group 2 has been inserted into the battery case 8, a welding electrode bar is inserted into a hole at the center of the electrode group 2 to attach the negative electrode lead plate to the bottom of the battery case 8 by resistance welding. Then, an insulating plate 10 is placed on the upper end surface of the electrode group 2. For purposes of illustration, FIG. 6A illustrates the insulating plate 10 that is placed on the upper end surface of the electrode group 2 before the insertion into the battery case 8.

Subsequently, the battery case 8 is compressed with a die at a portion close to the open end, thereby forming the cylindrical open end portion 9 as shown in FIG. 6B. Additionally, while the battery case 8 is being rotated, a roll die (not shown) being rotated in the direction opposite to the rotational direction of the battery case 8 is pressed against the side surface of the open end portion 9 to form annular groove 12 thereon as shown in FIG. 4. The electrode group 2 is thereby fixed inside the battery case 8.

Subsequently, a predetermined amount of electrolyte solution is poured into the battery case 8 through the hole at the center of the electrode group 2. Furthermore, the sealing member 4 shown in FIG. 6C is connected by resistance welding at its filter (not shown) with the positive electrode lead plate 11. After an insulating ring (not shown) is inserted into the open end portion 9, the sealing member 4 is inserted into the open end portion 9, thereby placed on an annular supporting portion expanded into the battery case 8, that are provided by the annular groove 12. With this arrangement, the open end portion 9 is caulked inwardly to seal the portion 9 with the sealing member 4, thereby forming the prismatic battery shown in FIG. 4.

Now, the results of the experiments conducted by the present inventors are described below. First, the prismatic battery according to the first embodiment was fabricated as follows. That is, a strip of the positive electrode plate chiefly composed of nickel hydroxide and a strip of the negative electrode plate chiefly composed of hydrogen-absorption alloy, between which interposed was a separator, were superimposed on the other. In addition, the positive electrode lead plate 11 was protruded in one direction from the end of the positive electrode plate and the negative electrode lead plate was protruded in the other direction from the end of the negative electrode plate. With this arrangement, the positive electrode plate, the negative electrode plate, and the separator were wound in a spiral manner to form the electrode group 2. The battery case 1 was configured to have a cross section to satisfy that R1/r=4.5, where the radius of curvature R1 was set to 50 mm and the distance r was set to 11 mm, respectively. Using the electrode group 2 and the battery case 1, a first prismatic battery was fabricated through the same process as described with reference to FIGS. 6A to 6C.

To fabricate the prismatic battery according to the third embodiment, the same electrode group 2 was constructed as that used for the aforementioned first prismatic battery. The battery case 8 was configured to have a cross section to satisfy that R1/r=9.1 and R2/r=0.36, where the radius of curvature R1 was set to 100 mm, the distance r was set to 11 mm, and the radius of curvature R2 of a corner was set to 4 mm, respectively. Using the electrode group 2 and the battery case 8, a second prismatic battery was fabricated through the same process as described with reference to FIGS. 6A to 6C.

Additionally, as comparative examples, fabricated were a third, fourth, and fifth prismatic battery. As shown in the table below, the prismatic batteries of these comparative examples were fabricated using battery cases that satisfied conditions of the present invention neither that R1/r=4 to 20 nor that R2/r=0.3 to 0.8. The five types of battery cases each have a uniform thickness of 0.26 mm at all the portions including the lateral wall portions and the corners. All the batteries are nickel-metal hydride batteries.

After having been subjected to an ambient temperature of 25° C. for 12 hours, each of the prismatic battery was charged and discharged for the first time (charged for 15 hours at a current of 0.1C, while discharged for 4 hours at a current of 0.2C) to examine the degree of expansion of the battery case. The degree of the expansion was determined as follows. That is, on the outer surface of the battery case at the center in the longitudinal direction, the distance between the centers of lateral walls that were opposite to each other was measured before the charging. Then, after the charging was carried out until the internal pressure of the battery reached 15 kgf/cm$^2$ at which a safety vent was initiated in the sealing member 4, the distance between the same points as mentioned above was measured. Then, a value was determined by subtracting the distance before the charging from that after the charging. The results obtained in the tests are shown in Table 1. In Table 1, the first to fifth batteries are shown by B1 to B5, the radius of curvature of a lateral wall by R1, and the radius of curvature of a corner by R2, respectively. The numerical values are all expressed in mm except for R1/r and R2/r.

TABLE 1

| | R1 | R2 | R1/r | R2/r | Before test | After test | Degree of expansion |
|---|---|---|---|---|---|---|---|
| B1 | 50 | — | 4.5 | — | 22.00 | 22.95 | 0.95 |
| B2 | 100 | 4 | 9.1 | 0.36 | 22.00 | 22.73 | 0.73 |
| B3 | — | 4 | — | 0.36 | 22.00 | 23.65 | 1.63 |
| B4 | 250 | — | 22.7 | — | 22.00 | 23.60 | 1.60 |
| B5 | 100 | 2 | 9.1 | 0.18 | 22.00 | 23.55 | 1.55 |

As can be seen clearly from the test results, the first and second prismatic batteries B1, B2 related to these tests have a degree of expansion of 0.95 mm and 0.73 mm, respectively, which are far less than that of the third, fourth, and fifth prismatic batteries of the comparative examples. This is because the lateral walls are appropriately arc-shaped to expand outwardly within the range of R1/r=4 to 20, thereby preventing expansion.

In contrast, the third prismatic battery B3 is rounded at the corners but is provided with the flat lateral walls, thereby making the degree of expansion as much as 1.63 mm. The fourth prismatic battery B4 allows the lateral walls to expand outwardly with a large radius of curvature (R1=250 mm) under the condition of R1/r>20, thereby also resulting in insufficient prevention of expansion to provide a degree of expansion as much as 1.60 mm. Furthermore, the fifth prismatic battery B5 is configured such that the lateral walls are gradually arc-shaped to expand outwardly within the preferred range of 4<R1/r<20, however, the corners are rounded such that R2/r<0.3. This reduces the effect of preventing expansion in half, thereby resulting in a degree of expansion of 1.55 mm that is greater than that of the first and second prismatic batteries B1, B2. From those results described above, it has been found that the lateral walls should be expanded outwardly within the range of R1/r=4 to 20 and each corner should be rounded within the range of R2/r=0.3 to 0.8 in order to efficiently prevent expansion at the time of an increase in pressure inside the battery.

Industrial Applicability

As described above, according to the prismatic battery of the present invention, the lateral walls of a battery case, which is substantially rectangular in cross section and has generally the same high space efficiency as that of an existing prismatic battery, are each gradually arc-shaped to expand outwardly. This makes the battery case suitable for positively preventing each lateral wall from being deformed outwardly when an increase in pressure inside the battery occurs due to gases produced during charge and discharge and expansion of an electrode group.

Furthermore, since this prismatic battery increases its inner volume by such an amount as provided by the lateral walls that are slightly expanded outwardly, it is possible to accommodate more power generation elements such as electrolyte solution in the increased space, thereby improving the energy density. In addition, with the battery case being entirely formed in a uniform thickness, it is possible to prevent the lateral walls from expanding. Thus, without any decrease in inner volume even in generally the same outer shape as that of an existing prismatic battery, the prismatic battery provides a large amount of current at the time of charge and discharge. This makes the prismatic battery useful for providing the battery characteristics of a large capacity and a high energy density.

What is claimed is:

1. A prismatic battery comprising a prismatic tubular battery case (1, 8) for housing an electrode group (2) and electrolyte solution, with an open end of the battery case being sealed with a sealing member (4), wherein the battery case (1, 8), being substantially square in cross section, has four lateral walls (5, 6) each being gradually arc-shaped to curve outwardly with a radius of curvature R1, and the cross section satisfies equation R1/r=4 to 20, where r is a distance between a midpoint (C2) of each lateral wall (5, 6) and a center point (C1) in the cross section of the battery case (1, 8) and R1 is the radius of curvature.

2. The prismatic battery according to claim 1, wherein the battery case (8) is rounded at each corner with a radius of curvature of R2, and has a cross section satisfying equation R2/r=0.3 to 0.8, where r is the distance and R2 is the radius of curvature.

3. The prismatic battery according to claim 1, wherein the cross section of the electrode group (2) is formed corresponding to the cross section of the battery case (1, 8).

4. A prismatic battery comprising a prismatic tubular battery case (7) for housing an electrode group (2) and electrolyte solution, with an open end of the battery case (7) being sealed with a sealing member (4), wherein the battery case (7), being substantially rectangular in cross section and with a pair of long lateral walls (7a) facing each other, has the cross section such that the long lateral walls (7a) are each gradually arc-shaped to curve outwardly with a radius of curvature R11 to satisfy equation R11/r1=4 to 20, where r1 is a distance between a midpoint (C21) of the long lateral wall (7a) and a center point (C3) in the cross section of the battery case (7) and R11 is the radius of curvature, and the battery case (7), being substantially rectangular in cross section and with a pair of short lateral walls (7b) facing each other, has the cross section such that the short lateral walls (7b) are each gradually arc-shaped to curve outwardly with a radius of curvature R12 to satisfy equation R12/r2=4 to 20, where r2 is a distance between a midpoint (C22) of the short lateral wall (7b) and the center point (C3) in the cross section of the battery case (7) and R12 is the radius of curvature.

5. The prismatic battery according to claim 4, wherein the cross section of the electrode group (2) is formed corresponding to the cross section of the battery case (7).

* * * * *